United States Patent Office 3,718,899
Patented Feb. 27, 1973

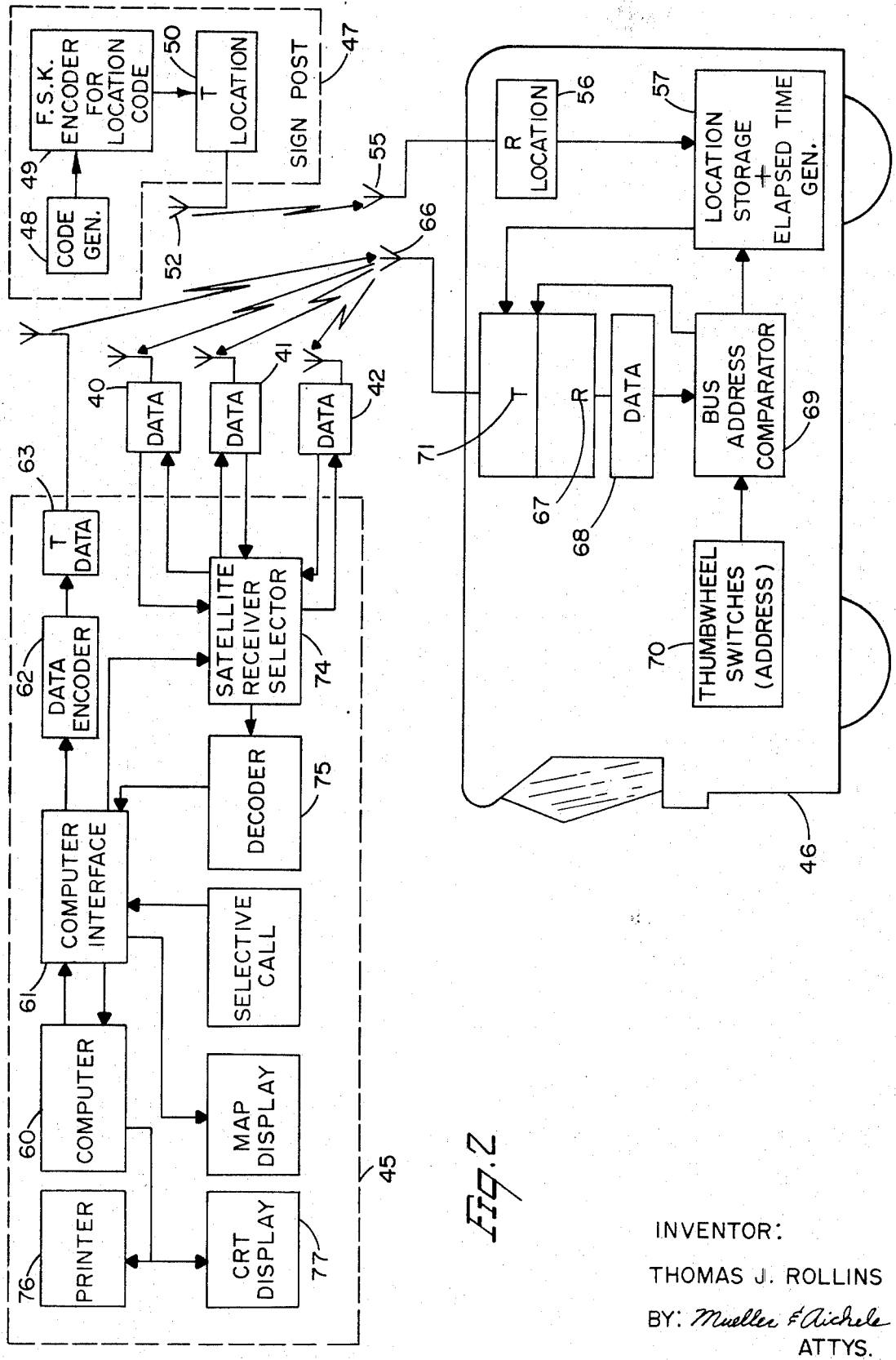

3,718,899
VEHICLE MONITORING SYSTEM INCLUDING AUTOMATIC PRESELECTION OF DESIRED SATELLITE RECEIVER
Thomas J. Rollins, Arlington Heights, Ill., assignor to Motorola, Inc., Franklin Park, Ill.
Filed Apr. 5, 1971, Ser. No. 131,121
Int. Cl. G08g 1/12
U.S. Cl. 340—23                    16 Claims

ABSTRACT OF THE DISCLOSURE

A satellite receiver selection system for a vehicle monitoring system where the vehicle to be monitored travels along a predetermined route. The vehicle includes storage circuitry for storing information signals indicative of its position as it moves along the route, and a transmitter in the vehicle transmits the information signals at particular times. A number of satellite receivers are located along the route for receiving the vehicle's transmitted information signals. These satellite receivers are coupled to a central control station that includes a memory or storage device containing information as to the schedule and position of the vehicle as it travels along the predetermined route. The information signals are coupled from the satellite receiver stations to the central control station where they are compared with the stored information to develop a comparison signal that is used to selectively operate the satellite receiver nearest the vehicle at the time of the next transmission from the vehicle.

BACKGROUND

Mass transportation systems, such as bus systems, commonly operate over established routes in accordance with pre-established schedules. In order to most efficiently utilize the bus equipment and to provide the most satisfactory service to the riders of the buses, it is necessary to maintain the operating schedules of the buses as close as possible to the schedules which have been established for each of the buses in the system. Complex two-way communication systems have been devised, some including computers, wherein the buses in the system are interrogated and the bus location information is sent to a central control station. At the central control station the information from each vehicle is compared to the pre-established schedule. If there is any inconsistency between the pre-established schedule and the received information, the deviation will be displayed on a control console at the control station. A mobile radio in the bus is used to transmit the location information to the control station. A system such as that described above is described in greater detail in a copending application, Ser. No. 888,519, filed Dec. 29, 1969, now U.S. Pat. No. 3,644,883, and assigned to the same assignee as this application.

Systems such as that described above and in the copending application must interrogate a great number of vehicles in a short period of time. As these vehicles may be located at a great number of locations throughout the city, a number of satellite receivers must be used in order to receive the signals transmitted by the mobile units in the buses. In previous systems, receiver selection or voting systems were employed in order to select a satellite receiver receiving the best signal from a particular vehicle being interrogated. In these systems the receiver selection is based upon a comparison of the signal strength of the vehicle's signal by the satellite receivers, as the signal from the vehicle was being received. As this decision must be made at the time the vehicle transmits, the vehicle must transmit initially for an extra period of time. Although only a short period of time is required for the satellite receivers to select the receiver receiving the best signal, the time delay caused by the additional transmission from each vehicle in the system can become quite substantial when a large number of vehicles are involved, and this delays interrogation of all the vehicles in the system.

SUMMARY

It is therefore an object of this invention to provide an improved satellite receiver selection system wherein satellite receiver voting selection during signal reception is eliminated.

It is another object of this invention to provide an improved satellite receiver selection system wherein time delays in receiving signals from each vehicle in the system are substantially reduced.

It is a further object of this invention to provide an improved satellite receiver selection system in which one of a plurality of satellite receivers in the system is selected in accordance with either the pre-established schedule or location information transmitted by a vehicle during the previous transmission.

In practicing this invention a satellite receiver selection system is provided in a vehicle monitoring system where the vehicles in the system travel along predetermined routes in accordance with a pre-established schedule. Each vehicle contains storage circuitry for storing information signals identifying the vehicle, and indicative of its position as it moves along the predetermined route. A transmitter in the vehicle transmits vehicle information signals at predetermined times. If the vehicle includes a receiver, the vehicle can transmit the signals in response to interrogation signals transmitted from a central location. A plurality of satellite receiver stations are located at various points for receiving information signals from the vehicles. The information signals are coupled from the satellite receivers to a central control station which includes a satellite receiver selector and decoder for selecting a receiver and decoding the signal. In the preferred embodiment, the central control station also includes a computer. The computer is programmed with the predetermined route and pre-established schedule of each vehicle. The received information signals are converted to digital information by the decoder and coupled to the computer where they are compared to the stored information regarding the schedule and position of the monitored vehicle, and the locations of the satellite receivers in the system. From this comparison the computer develops control signals. At a predetermined time the control signals are coupled to the satellite receiver selector and decoder for selecting the particular satellite receiver nearest the vehicle at the time of the next transmission of information signals.

BRIEF DESCRIPTION OF THE DRAWINGS

FIG. 2 is a block diagram showing a second embodiment of the satellite receiver selection system of this invention.

DETAILED DESCRIPTION

Figure 1:
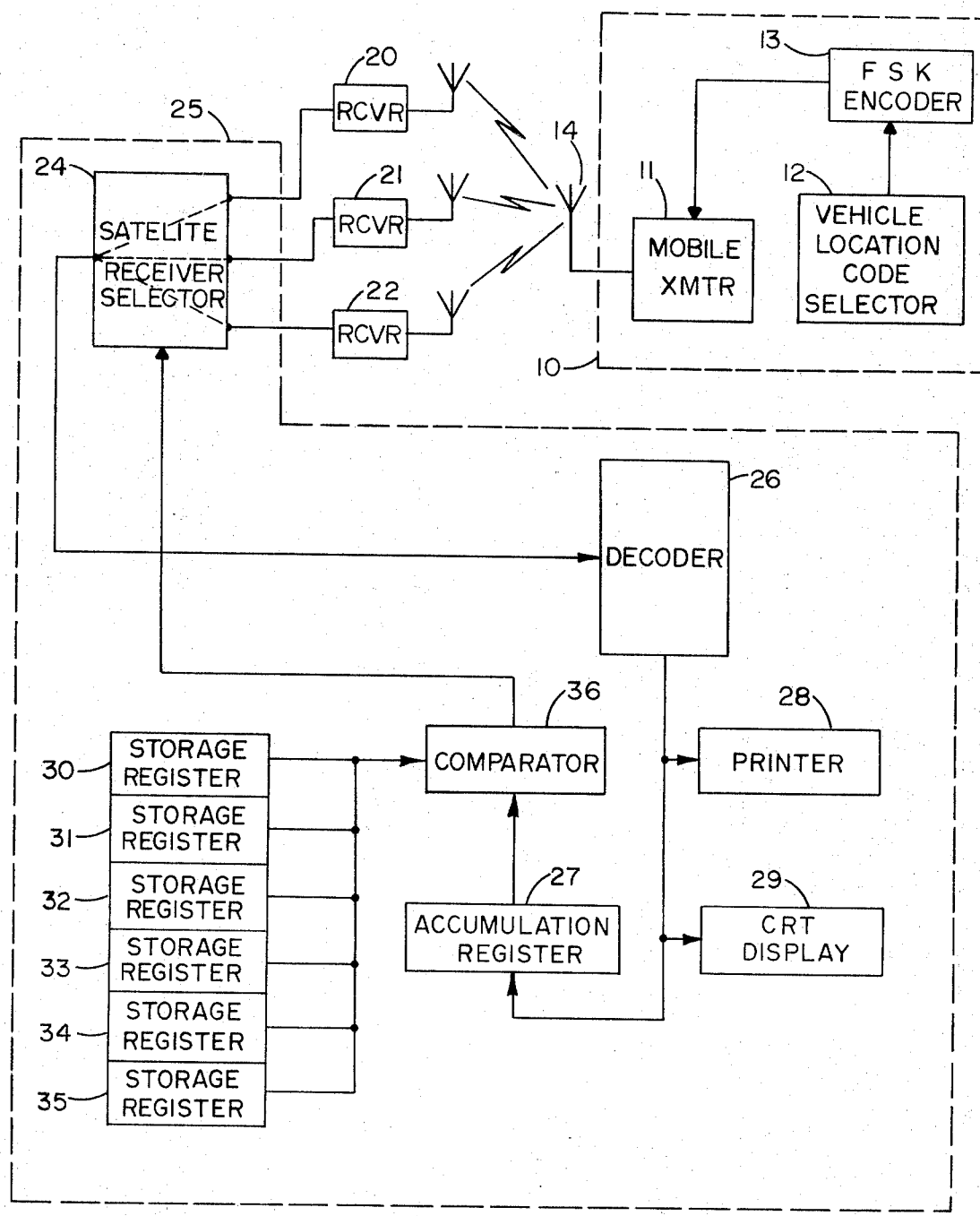
FIG. 1 is a block diagram showing one embodiment of the satellite receiver selection system of this invention.

Referring to FIG. 1 there is shown one form of satellite receiver selection system for a vehicle monitoring system where the vehicle to be monitored travels along a predetermined route. The vehicle to be monitored, shown by the dash lines at 10, may be a bus operating in a metropolitan transit system. Vehicle 10 includes a mobile transmitter 11, a vehicle and location code selector 12 and an encoder 13. Vehicle and location code selector 12 may include thumbwheel switches or other such devices for selecting the vehicle identification code and location identification code. The code may be digitally coded information signals including vehicle identification and location signals, such as described in greater detail in the copending application, Ser. No. 888,519, identified above. In a relatively simple system such as is here described, transmission of the digitally coded vehicle identification and location signals can be instituted by the vehicle driver at prearranged or timed intervals. Upon initiation of a transmission by the bus driver, the digitally coded vehicle information signals are coupled to FSK encoder 13 where they are converted to tone modulated signals. The tone modulated signals are coupled to mobile transmitter 11 where they are used to modulate an RF carrier in the same manner used for voice modulation. The RF carrier signals are transmitted by antenna 14 of mobile unit 10.

The RF signals transmitted by mobile unit 10 are received by a number of satellite receivers, three of which are shown at 20, 21 and 22. These satellite receivers are located at outlying locations scattered throughout the area to be monitored. The signals received by the satellite receivers are coupled to a central control station indicated by the dash lines 25. In most instances the interconnection between the satellite receivers and the central control station 25 is via telephone lines. At central control station 25, the signals from the satellite receivers are individually coupled to satellite receiver selector 24. Satellite receiver selector 24 selects one of the three receivers 20, 21 and 22 in a manner to be more fully described in a subsequent portion of this application, and couples the selected receiver to decoder 26. In this simplified embodiment, we assume one of the receivers to be preselected, and the system operational in order to couple the signals to decoder 26. Decoder 26 decodes the tone modulated signals to develop the digitally coded vehicle identification and location signals. The digitally coded vehicle identification and location signals are coupled to accumulation register 27. A number of storage registers at central control station 25, indicated at 30 through 35, are provided in which the digitally coded identification signals for each vehicle and for each one of the predetermined locations which can be transmitted by a vehicle have been stored. Although six registers are shown, as many can be provided as are necessary in the particular system. Comparator 36 is coupled to storage registers 30 through 35 and to accumulation register 27. The binary coded vehicle identification and location signals received by the accumulation register 27 are compared with the signals in registers 30 through 35 by comparator 36. When there is a correlation between the signals in accumulation register 27 and the signals in one of the storage registers 30 through 35, a digital control signal is developed by comparator 36. A different digital control signal is developed for each one of the possible comparisons. This digital control signal is coupled from comparator 36 to satellite receiver selector 24 where it is used to select the particular one of the satellite receivers 20, 21 and 22 which will be nearest to vehicle 10 at the time of the next transmission from vehicle 10. To further clarify as the predetermined vehicle location at the time of receipt of each transmission is known as well as which satellite receiver is closest to that location, a recognition by comparator 36 of the receipt of a location code transmitted by the vehicle will generate a control signal, which will cause satellite receiver selector 24 to select the satellite receiver which should be closest to the vehicle when it transmits its next location code signal. Satellite receiver selector 24 in this system can be a number of transistor gates or switches, one for each satellite receiver, with each one being operated by one or more comparator control signals to couple a satellite receiver to decoder 26. By preselecting the satellite receiver closest to the vehicle's location at the time of the next transmission, delays previously associated with satellite receiver selection systems are substantially reduced.

In addition to the digitally coded information signals being coupled to accumulation register 27 from decoder 26, they are also coupled to printer 28 and CRT display device 29. At printer 28 the digitally coded signals are converted into characters on a printed page, which identify the vehicle and its location. The same information is shown on CRT display device 29. This allows the attendant to visually monitor the vehicles and their location in order to determine whether they are maintaining their proper schedules.

Referring to FIG. 2 there is shown a second, substantially more complicated, vehicle monitoring system, including a satellite receiver selection system containing the features of this invention. A detailed explanation of the operation of the various components and the coding and timing employed in this system can also be found in the copending patent application, Ser. No. 888,519. In addition to the satellite receivers, three of which are indicated in FIG. 2 at 40, 41 and 42, this system includes a central control station 45, vehicles such as bus 46, and location identification equipment such as a sign-post transmitter unit 47. Sign-post transmitter units 47 are located at spaced intervals, with a convenient spacing being generally of the order of several blocks, depending upon the rate at which the buses normally traverse the particular section of the route located between successive sign-post transmitters 47. The transmitter units 47 each include a digital code location signal generator 48, which provides a unique digital location code particularly identifying the location of the sign-post with which the code generator is associated. Code generator 48 supplies the digital sign-post location code to an FSK encoder 49, which converts the digital code into tones which are then utilized to modulate an RF carrier, developed by local transmitter 50, in the same manner used for voice modulation. These modulated RF signals from transmitter 50 are then continuously transmitted from an antenna 52 at each sign-post 47 located throughout the system.

Transmitter 50 is chosen to be a low power device which transmits only over a limited range. The short range of transmitter 50 is chosen so that it is necessary for a bus such as bus 46 to be near the sign-post in order to receive the information. For a practical system it has been determined that if the range of sign-post transmitter 47 is in the order of 200 feet, adequate operation of this system results. Sign-post transmitter 47 may be mounted on a traffic light post and may receive power from the power supply to the traffic lights, so that installation of sign-post transmitter unit 47 is relatively simple.

The signals transmitted from antenna 52 of sign-post transmitter 47 are received by antenna 55 on bus 46 when the bus is within the range of the transmitter 47, and coupled to sign-post location receiver 56 in bus 46. Each time that the receiver 56 in bus 46 receives a new transmission from a sign-post unit 47, the digital location code is supplied by sign-post location receiver 56 to a location storage and elapsed time generator unit 21, located within bus 46. The storage of a new sign-post location code causes the elapsed time generator in unit 21 to be reset to an initial time, with the time generator then providing a measurement of the time interval occuring subsequent to the storage of the location code in unit 21. Thus, after passing a sign-post unit 47, bus 46 has stored a location code corresponding to that sign-post and further continues to record or measure the time which has elapsed since the bus passed the sign-post location.

At control station 45, a computer 60 is provided with all of the route and scheduling information of all of the different buses 46 in the system. Computer 60 is programmed to provide a continual sequence of location interrogation addresses to a computer interface unit 61. These addresses include a unique identification address for each bus, accompanied by a digitally encoded location interrogation sequence. This sequence is coupled from computer interface unit 61 through a data encoder 62, which modulates the output of a data transmitter 63, operating on a data interrogation frequency, to continually and sequentially interrogate the buses in the system in accordance with the interrogation program provided by computer 60.

The transmitted interrogation signals are received by an antenna 66 on bus 46, and applied to a receiver unit 67. The address is coupled to data decoder 68 where it is decoded to provide the original digitally coded address. This digitally coded address is coupled from data decoder 68 to bus address comparator 69 where it is compared against the unique preset digitally coded bus identification address supplied by address unit 70. Address unit 70 may be prewired or may contain thumbwheel switches in order to easily change the bus identification address. Whenever the interrogation address in comparator 69 corresponds to the address set in address unit 70 within the bus, comparator 69 provides an output initiation signal to the local storage and elapsed time generator 57. Generator 57 provides digitally coded output information signals indicating the vehicle, location and elapsed time to a transmitter unit 71 located in the bus. Transmitter 71 then automatically transmits the information signals on a data frequency from antenna 66 to central control station 45.

The information signals transmitted from antenna 66 of bus 46 are received by a number of satellite receivers, three of which are indicated at 40 and 41 and 42. Receivers 40, 41 and 42 may be at outlying locations scattered throughout the area to be covered by the monitoring system. One of the plurality of satellite receivers located throughout the city will be closer in proximity to the vehicle to be monitored at a particular time than any of the other receivers. The information signals received by that receiver will therefore be stronger, and there will be less chance for an erroneous receipt of information, due to poor signal levels or extraneous system noise. The information signals received by the satellite receivers are coupled to central control station 45. In most systems such as the system being described, telephone lines are used to couple the satellite receivers to the central control station. At central control station 45, the satellite receiver closest in proximity to the interrogated vehicle is selected by satellite receiver selector 74 in a manner to be further described below, and coupled to decoder 75. The signals are then decoded by decoder 75 to provide digitally coded signals which include the vehicle identification code signpost location code, and the elapsed time. These digitally coded signals are then coupled through computer interface 61 to computer 60.

As previously stated, computer 60 contains all the route and scheduling information for all the buses in the system to be monitored. At the same time as computer 60 supplies location interrogation addresses through computer interface 61 and data encoder 62 to transmitter 63; it also supplies a satellite receiver selection address, selected in accordance with the stored bus schedule information, through computer interface 61 to satellite receiver selector 74. This satellite receiver selection address causes satellite receiver selector 74 to enable the satellite receiver which is indicated by the computer program to be closest to the interrogated vehicle at the time of the interrogation. In this system then, as in the system described above, a satellite receiver which should be nearest the vehicle which is being interrogated is selected prior to reception of the signal from the remote vehicle, thereby eliminating the time required in prior systems for receiver voting or selection. In this system however a computer is programmed to select the appropriate satellite receiver rather than using the digital comparison circuitry previously described.

In addition to selecting the receiving path from the appropriate satellite receiver, computer 60 also compares the information transmitted by bus 46 with the pre-established schedule for that bus stored in the computer. If the bus is on schedule or within pre-established limits of the schedule, no output is provided by computer 60. If bus 46 is not on schedule, or within the limits of the schedule, computer 60 provides an output to printer 76 which maintains a permanent record of all off schedule operations and, in addition provides the same information to a CRT display device 77, so that the dispatcher has immediate information with respect to the identity and location of the off schedule bus 46. Additionally, computer 60 compares the received vehicle identification and location information with the locations of all satellite receivers capable of receiving signals from bus 46 along the pre-established route. The computer then determines which satellite receiver would be nearest bus 46 at the time of next scheduled interrogation and stores that information in its storage circuitry. At the time of the next scheduled interrogation of bus 46 the stored information as to the nearest satellite receiver to bus 46 is sent from computer 60 through computer interface 61 to satellite receiver selector 74, to select that satellite receiver. The selection information in computer 60 which would normally select the satellite receiver indicated as appropriate by the pre-established program, is suppressed by the computer when the selection information in the storage circuitry is transmitted.

By first selecting the satellite receiver indicated to be nearest the vehicle at the time of interrogation in accordance with a pre-established vehicle schedule, and then comparing the received information from the vehicle which indicates the vehicle's exact location with the stored information, a satellite receiver may be selected by the computer which is closest to the vehicle being monitored. By selecting prior to signal reception the delays inherent in satellite receiver selection at the time of receipt of the signals are substantially reduced.

I claim:

1. A vehicle monitoring system having at least one vehicle to be monitored, said monitoring system including in combination; storage means in the vehicle for storing information signals indicative of the position of the vehicle as it moves along a predetermined route, transmitting means coupled to said storage means for transmitting said information signals, a plurality of satellite receiver means located at scattered locations for receiving said vehicle information signals, a central control station selectively coupled to said satellite receiver means for receiving said information signals therefrom, said control station including computer means storing information as to the schedule and position of the vehicle and operative in response to at least said stored information to selectively couple the particular one of said satellite receiver means which should be nearest said vehicle to the control station.

2. The vehicle monitoring system of claim 1 wherein said computer means is operative in response to said stored information and said received information signals to selectively couple said particular one of said satellite receiver means to said control station.

3. The vehicle monitoring system of claim 1 wherein said central control station further includes, satellite receiver selector means coupled between said satellite receiver means and said computer means, said computer means developing selection signals in response to said stored information, said satellite receiver selector means being operative in response to said selection signals from said computer means to selectively couple one of said satellite receiver means to said control station for allowing receipt of said information signals thereby.

4. The vehicle monitoring system of claim 3 wherein said storage means for storing information signals includes, first storage means for storing vehicle identification code signals and location code signals indicating the vehicle location.

5. The vehicle monitoring system of claim 4 wherein said first storage means further includes vehicle identification means for selecting a particular vehicle identification code for storage therein.

6. The vehicle monitoring system of claim 5 wherein said first storage means includes location identification means for entering a particular location code signal for storage therein.

7. The vehicle monitoring system of claim 5 wherein said central control station further includes transmitter means coupled to said computer means and operative in response to signals therefrom to transmit interrogation signals to the vehicles in the system, said vehicle further including receiver means for receiving said interrogation signals, and circuit means coupled to said receiver means and operative in response to receipt of said interrogation signals to actuate said transmitting means in said vehicle for transmitting said information signals.

8. The vehicle monitoring system of claim 7 wherein the interrogation signals transmitted from the central control station include a vehicle identification code portion, and said circuit means at said vehicle includes comparison means coupled to said receiver means and to said storage means, said comparison means being operative to compare said received vehicle identification code portion and the vehicle identification code in said first storage means and develop a comparison signal in response to a comparison therebetween, said comparison signal being operative to actuate said storage means and said transmitter to cause transmission of said information signals.

9. The vehicle monitoring system of claim 8 further including location indicating transmitting means located at predetermined positions along the route traveled by the vehicle and having a limited transmitting range, said location indicating means transmitting a particular location code signal from the location, said vehicle receiver means operative to receive said location code signal when within the transmitting range and store same in said first storage means.

10. The vehicle monitoring system of claim 9 wherein said storage means in the vehicle further includes elapsed time indication means, said elapsed time indication means operative to reset to an initial time indication in response to receipt of a new location code signal by said first storage means, and further operative to develop time code signals for indicating the time interval subsequent to the resetting of the elapsed time indicating means, said time code signals forming a portion of said information signals.

11. A vehicle monitoring system having at least one vehicle to be monitored, said system including in combination: storage means in the vehicle for storing vehicle information signals indicative of the position of the vehicle as it moves along a predetermined route, transmitting means coupled to said storage means for transmitting said information signals at particular times including a first particular transmission time and a next particular transmission time, a plurality of satellite receiver means at scattered locations for receiving said vehicle information signals, a central control station coupled to said satellite receiver means for receiving said vehicle information signals therefrom, said control station including memory means for storing information as to the schedule and position of the vehicle, and comparison means for comparing the stored information with the received vehicle information signals, said central control station including means selectively operating a particular one of said satellite receiver means which should be nearest said vehicle at said next particular transmission time in accordance with said stored information and said received information signals transmitted at said first particular transmission time for allowing receipt of the information signals transmitted at said next particular transmission time.

12. The vehicle monitoring system of claim 11 wherein said vehicle information signals include, a location code signal indicative of a particular location along the predetermined route, said memory means further including a plurality of storage means each storing a location code signal for a particular location along said predetermined route, said comparison means comparing said received location code signal and said stored location signal and developing comparison signals in response to a correlation therebetween, said central control station operative in response to said comparison signals to selectively operate a particular one of said plurality of satellite receiver means nearest said vehicle at the time said vehicle next transmits information signals, for allowing receipt of said next transmitted information signals by said central control station.

13. The vehicle monitoring system of claim 12 wherein said vehicle storage means includes, first storage means for storing a vehicle identification code signal and for storing a location code signal indicating a particular location along said predetermined route.

14. The vehicle monitoring system of claim 13 wherein said first storage means includes, selection means for selecting a particular vehicle identification code signal and for selecting a particular location code signal for storage in said first storage means.

15. The vehicle monitoring system of claim 14 wherein said central control station further includes, satellite receiver selector means coupled to said plurality of satellite receivers and to said memory means, said satellite receiver selector means operative in response to said comparison signals to selectively operate one of said satellite receiver means, and couple said received information signals from said selected satellite receiver to said comparison means.

16. The vehicle monitoring system of claim 15 wherein said central control station further includes, display means coupled to said satellite receiver selector means for receiving said information signals therefrom, said display means operative in response to said information signals to display said vehicle identification and location information.

References Cited

UNITED STATES PATENTS

| | | | |
|---|---|---|---|
| 3,419,865 | 12/1968 | Chisholm | 340—24 X |
| 3,568,161 | 3/1971 | Knickel | 340—24 X |
| 2,972,742 | 2/1961 | Ross | 340—23 X |
| 3,546,696 | 12/1970 | Waters et al. | 340—23 X |
| 3,531,801 | 9/1970 | Huebscher | 343—112 R |

THOMAS W. BROWN, Primary Examiner